Nov. 2, 1965         W. KEIL ETAL         3,215,506
APPARATUS FOR CONTINUOUS POLYMERIZATION OF
VOLATILE MONOMERS PREEMULSIFIED WITH WATER
Filed June 6, 1962                        3 Sheets-Sheet 1
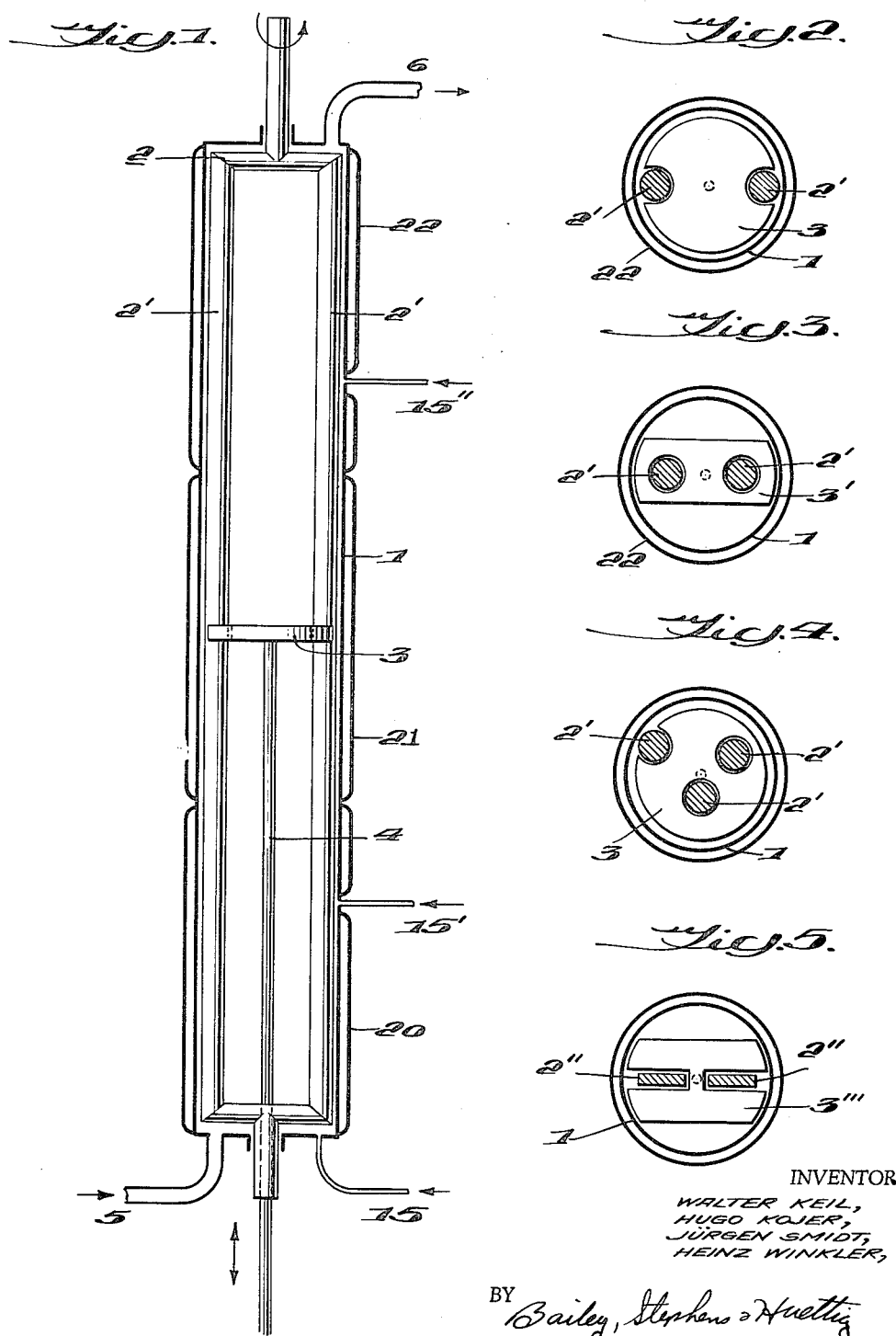
INVENTORS
WALTER KEIL,
HUGO KOJER,
JÜRGEN SMIDT,
HEINZ WINKLER,
BY Bailey, Stephens & Huettig
ATTORNEYS

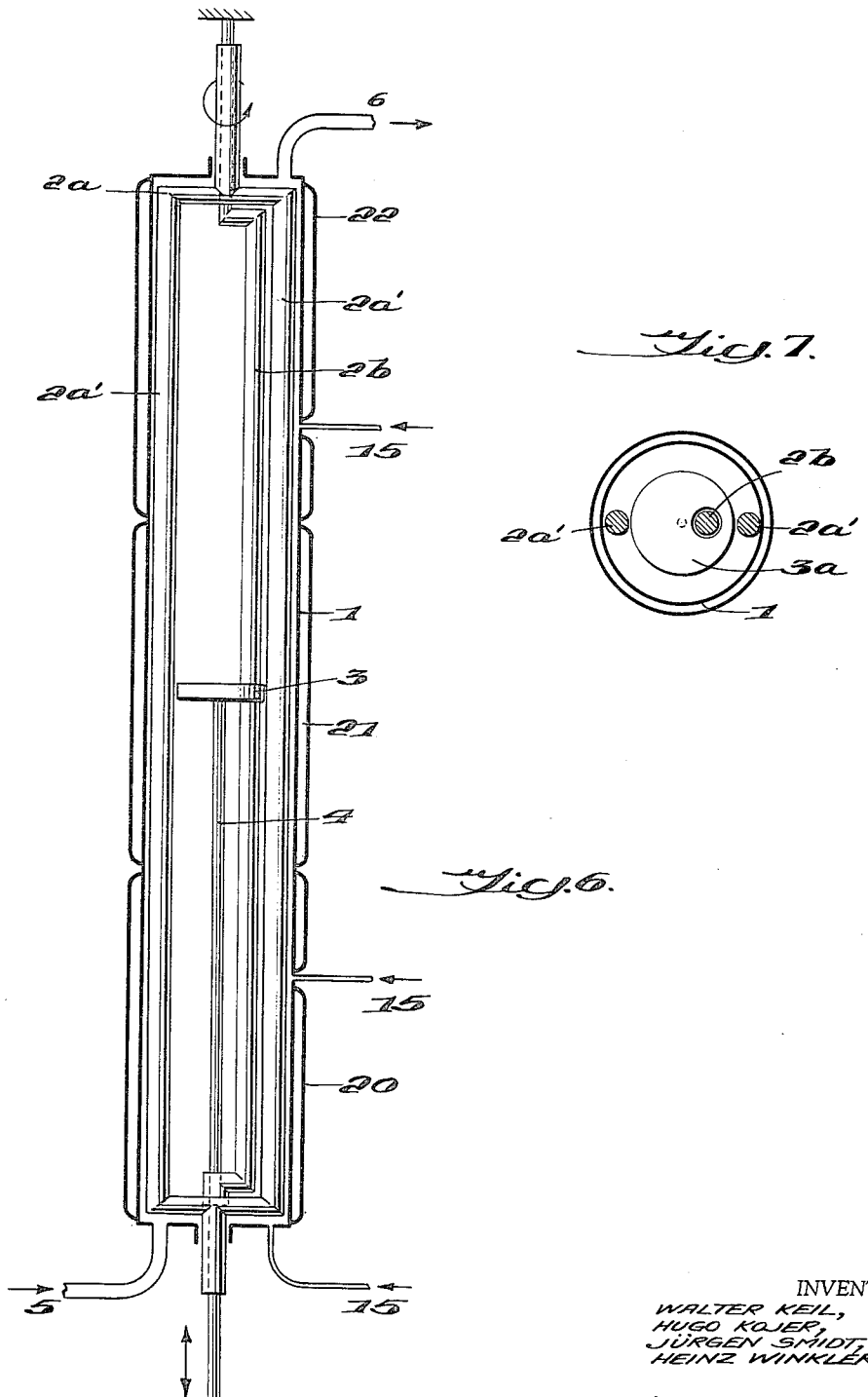

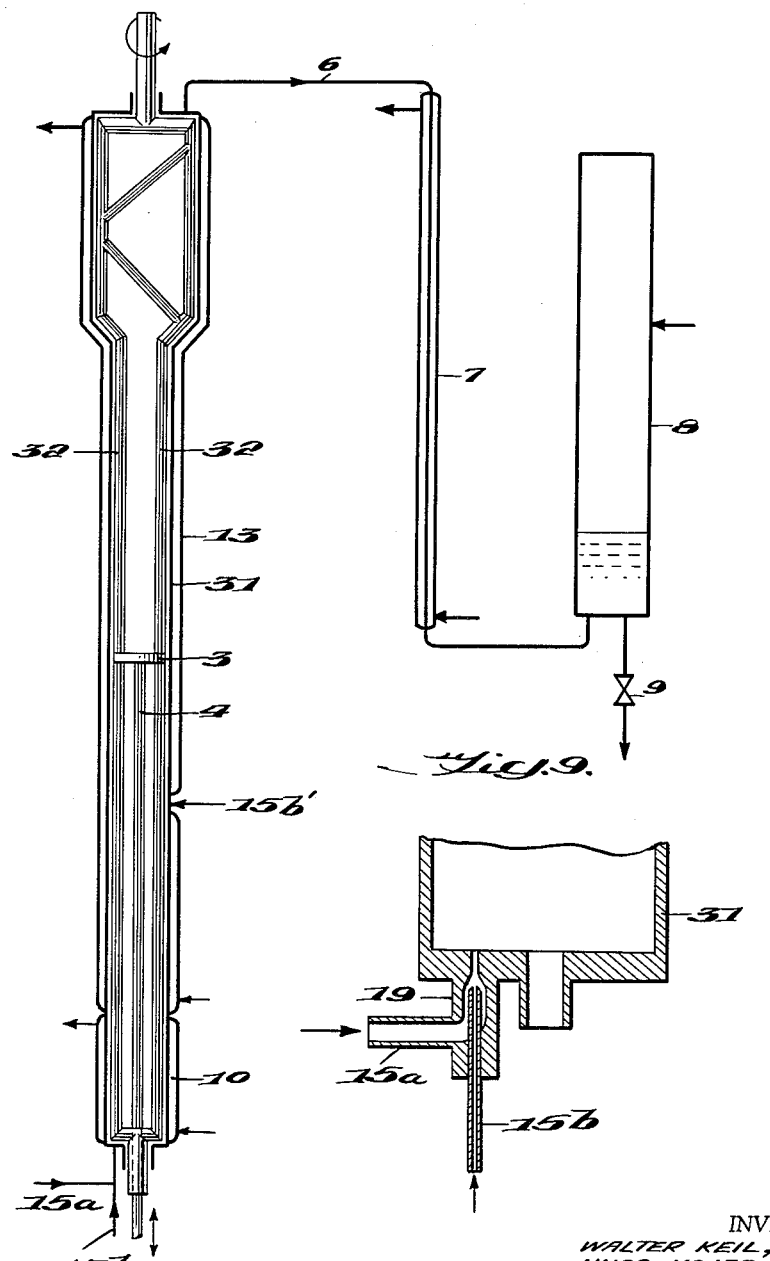

United States Patent Office 3,215,506
Patented Nov. 2, 1965

3,215,506
APPARATUS FOR CONTINUOUS POLYMERIZATION OF VOLATILE MONOMERS PREEMULSIFIED WITH WATER
Walter Keil and Hugo Kojer, Munich, and Jürgen Smidt, Munich-Solln, and Heinz Winkler, Burghausen, Upper Bavaria, Germany, assignors to Consortium fur Elektrochemische Industrie G.m.b.H., Munich, Germany
Filed June 6, 1962, Ser. No. 200,367
Claims priority, application Germany, June 9, 1961, C 24,333
2 Claims. (Cl. 23—285)

The present invention relates to a process for the continuous production of aqueous polymer dispersions by the polymerization of pre-emulsified monomers during passage through a tube reactor, as well as an apparatus for carrying out such process.

The continuous polymerization of unsaturated compounds in aqueous dispersion during passage through a tube reactor is already known. In such process, for example, a vertical tube is supplied from above with the liquid starting materials and the polymerized dispersion withdrawn from the bottom thereof. Emulsification and intermixing as a rule is effected in the reactor itself by stirring through a portion of the entire length of the reactor. In order to achieve a satisfactory rate of polymerization the temperature operated at is at or above the boiling temperature of the starting mixture. The monomer which separates off by evaporation condenses in the upper part of the reactor or in a reflux condenser connected to the top thereof and is there contacted with fresh emulsifier and initiator and again passed through the reactor. Despite the considerable advantages of operating continuously and the high space time efficiency of these and similar processes, they also possess several substantial disadvantages which hinder broad technical application thereof. The reemulsification of the monomer which separated off by evaporation requires intensive stirring and relatively high emulsifier concentrations. The intensive stirring requires intermixing parallel to the axis of the reactor tube and therefore in the direction of flow and thereby causes insufficient polymerization. In addition, the high emulsifier concentrations required deleteriously influence the properties of the finished polymer emulsion and especially the water resistance of coatings produced therefrom. Furthermore, it is not possible over long periods of operation to prevent deposit of solid polymer on the reactor walls and stirrer surfaces. As a consequence, a costly cleaning of the reactor often becomes necessary which renders it necessary to interrupt operation of the process. Preemulsification as normally used in emulsion polymerization in itself does not suffice to avoid the above mentioned disadvantages.

According to the invention, it was found that the continuous production of aqueous polymer emulsions by polymerization of monomers preemulsified in water with the aid of known initiators and emulsifying agents during passage through a tube reactor can be carried out advantageously and without disturbances by retarding the flow of the polymer emulsion from the reactor to such a degree that a pressure is achieved in the reactor which is sufficient to prevent separation of the monomer by evaporation at the temperature employed for the polymerization and by causing the reactor content to be mixed thoroughly perpendicularly to the direction of flow therethrough by a stirring means the surfaces of which in the polymerization zone lie parallel to the direction of flow and which surfaces are periodically or continuously cleaned by a stripping means movable parallel to the direction of flow and making provision that at least a portion of the edge of the stirring or of the stripping means sweeps over the walls of the reactor in the polymerization zone with as little clearance as possible.

The preemulsification of the mixtures supplied to the reactor can be carried out in a manner known per se. A large number of arrangements are suitable therefor, for example, colloid mills, high speed pumps, vibro stirrers, ultrasonic apparatus and nozzles, as well as high speed stirrers which project such mixtures against baffle surfaces. The emulsions are supplied to the reactor with suited feeding apparatus, for example, pumps.

The pressure required in the process according to the invention is achieved by retarding the exit of the polymer emulsion from the reactor with throttling means, such as narrow tube cross-sections or throttle valves. The extent of such retardation at the same cross-section increases with the viscosity of the polymer emulsion. In order to simplify the maintenance of the required pressure, it is expedient to provide a buffer space in the upper portion of the reactor, in the case of vertical or nearly vertical reactors, or in a receiver between the reactor and the throttling means in which the required pressure is adjusted with the aid of gases, such as nitrogen, which are inert with respect to the contents of the reactor.

The dimensions of the tube reactor depend upon the requirements of the polymerization at hand and the desired throughput. In order to achieve as small a structural volume as possible, it is expedient to effect any necessary preheating of the preemulsion and cooling of the finished emulsion outside of the actual reactor. The spatial position of the reactor can be selected as desired. However, a vertical arrangement with the flow therethrough directed upwardly is advantageous. The individual phases of the polymerization, namely, the initiation, the main reaction and the after reaction, can be regulated by zone wise heat exchange (cooling or heating). In order to increase the time of stay of the mixture of the after reaction zone without increasing the length of the reaction, it is advisable to widen the cross-section of the reactor in such zone. Furthermore, in many instances, it is advisable not to add all of the initiator components at once but rather stepwise by providing inlets therefor along the direction of flow in order to prevent too violent a polymerization.

Several embodiments of apparatus according to the invention are disclosed in the drawings in which:

FIGURE 1 shows a longitudinal section of a reactor according to the invention;

FIGURE 2 shows a cross-section of such reactor;

FIGURES 3–5 show cross-sections of various different modifications of reactors according to the invention;

FIGURE 6 shows a longitudinal section of another form of reactor according to the invention;

FIGURE 7 shows a cross-section of the reactor shown in FIGURE 6;

FIGURE 8 shows a longitudinal section of still another form of reactor according to the invention; and FIGURE 9 shows an enlarged sectional view of the mixing nozzle located at the bottom of the reactor shown in FIGURE 8.

In the aparatus shown in FIGURE 1 the reactor tube 1 is provided with heating and cooling jackets 20, 21 and 22, conduits 5, 15, 15', 15'' and 6 for the supply and withdrawal of the reactants, frame stirrer 2 and stripper 3 provided with actuating rod 4. The frame stirrer consists of two stirrer arms 2' of circular cross-section which are joined to both shaft ends over a cross-yoke. Both shaft ends of the stirrer extend, over packings, to the outside of the reactor for bearing and drive purposes. Upon rotation of the stirrer the stirring arms run extremely closely along the inner wall of the reactor (spaced 0.05 to 5 mm. therefrom) and keep it clean.

The stripper plate 3 can be moved by rod 4 in the direction of the axis of the reaction tube between the crossyokes of the stirrer. As can be seen from FIGURES 1 and 2, plate 3 is so constructed that it almost completely surrounds the stirrer arms 2' and strips them off, but is sufficiently spaced from the walls of the reaction tube to provide an annular space sufficient to permit the emulsion to pass freely. Rod 4 passes out of the reaction tube through a stuffing box in one of the shafts of the stirrer.

In the embodiment shown in FIGURE 3, the stirring arms 2' are spaced further, for example, about 5 to 30 mm., from the inner wall of the reaction tube than in the embodiment shown in FIGURES 1 and 2 and pass through close fitting openings in stripper plate 3'. The ends of stripper plate 3' pass close to the inner walls of the reaction tube so that upon actuation such stripper plate serves to keep both the stirrer arms and the inner wall of the reaction tube clean. Opposed segments are cut out of stripper plate 3' to permit passage of the emulsion.

In the embodiment shown in FIGURE 4, the stirrer is provided with three stirrer arms 2' so arranged that upon rotation of the stirrer they sweep over the entire cross-section of the reaction tube. The outer arm runs only slightly spaced from the inner wall of the reaction tube, the inner arms runs with a radius of about one-half the thickness of the stirring arm and the middle arm runs with a radius of a length between the radii of the other two arms. Stripper plate 3" closely surrounds all three stirring arms but leaves an annular space free between it and the inner wall of the reaction tube.

In the embodiment shown in FIGURE 5, the stirring arms 2" are in the form of flattened plates, the outer ends of which are spaced about 10 mm. from the inner wall of the reaction tube. Stripper plate 3''' serves to strip off the flat surfaces of the stirrer arms as well as the inner wall of the reaction vessel.

In the embodiment shown in FIGURES 6 and 7, a frame stirrer 2a substantially corresponding to the frame stirrer of FIGURES 1 and 2 is provided in which the stirring arms 2a' of circular cross-section pass closely along the inner wall of reaction vessel 1. In addition, a fixed flow spoiler 2b is provided which consists of an eccentric shaft arranged parallel to stirring arms 2a' mounted so as to prevent its rotation along with the frame stirrer. Stripper plate 3a about which arms 2a' of the frame stirrer rotate surrounds flow spoiler 2b and upon reciprocation with the aid of rod 4 serve to clean such flow spoiler as well as the inner surfaces of the arms of the frame stirrer.

The stirring velocity can be selected in the range of 20–2000 r.p.m. The stripping speed and throughput velocity can be adjusted according to the polymerization conditions at hand.

The process and apparatus according to the invention are suited for emulsion and especially for dispersion polymerizations in aqueous mediums using the usual recipes therefor. Emulsion polymerization as is known mostly is carrier out with anionic emulsifiers, occasionally with cationic or non-ionic emulsifiers, with the aid of water soluble persulfates and peroxides as catalysts. Occasionally radical formers which are soluble in the monomers to be polymerized are employed in place of the persulfates and peroxides (see C. E. Schildknecht, Polymer Processes, New York, 1956, page 70, and Bovey, Kolthoff, Medalia and Meehan, Emulsion Polymerization, New York, 1955, pages 55–93).

The above-mentioned initiators are also employed in dispersion polymerization. Protective colloids are usually employed as dispersing agents (see Schildknect, loc. cit., pages 105–109). Now and then the above-mentioned emulsifiers are used in conjunction with the protective colloids (see German Patent 951,235).

Illustrative examples of anionic emulsifiers are: alkali metal and especially the ammonium salts of fatty acids as lauric or palmitic acids, of the acid phosphoric acid alkyl esters, such as sodium diethylhexylphosphate, of the fatty alcohol sulfuric acid esters, of the paraffin sufonic acids, of the alkyl naphthalene sulfonic acids and of the sulfosuccinic acid dialkyl esters. The akali metal and ammonium salts of epoxy group containing fatty acids such as ammonium epoxy stearate as well as the alkali metal and ammonium salts of the reaction products of peracids such as peracetic acid with unsaturated fatty acids such as oleic or linolein acids with the formation of dihydroxy stearic acid and hydroxy-acetoxy stearic acid as well as the alkali metal and ammonium salts of the reaction products of peracids with unsaturated hydroxy fatty acids such as ricinoleic acid also have proved very suited as anionic emulsifiers.

Lauryl pyridinim hydrochloride is an example of a suitable cationic emulsifier.

Suitable non-ionic emulsifiers, for example, are: partial fatty acid esters of polyhydric alcohols such as glyceryl monostearate, sorbityl monolaurate or palmitate, partial fatty alcohol esters of polyhydric alcohols, polyoxyethylene ethers of fatty alcohols or aromatic hydroxy compounds, as well as the polyproylene oxide-polyethylene oxide condensation products known under the trade name "Pluronics."

Usually the quantity of ionic or non-ionic emulsifier employed amounts to about 0.1 to 3% by weight with reference to the monomer or monomers being polymerized.

Examples of suitable protective colloids, for instance, are: polyvinyl alcohol (which may still contain up to about 40 mol percent of acetyl groups), gelatine, cellulose derivatives such as water soluble methyl cellulose, carboxy methyl cellulose, hydroxy ethyl cellulose as well as copolymers of maleic acid as well as their semi-esters with styrene.

Examples of water soluble peroxides are: $H_2O_2$, sodium perborate and sodium percarbonate. Examples of water soluble persulfates are: ammonium and potassium persulfates. Examples of monomer soluble radical formers are: organic peroxides and hydroperoxides such as benzoyl-, lauroyl-, 2,4-dichlorobenzoyl-, acetyl cyclohexenesulfonyl-, cumyl-, hydro- and butyl hydroperoxides, as well as azo compounds such as azoisobutyric acid nitrile. These initiators can be employed in the usual redox systems, that is, in conjunction with reducing agents, such as tartaric acid or formaldehyde sodium sulfoxylate (Rongalit C). The quantity employed is as usual, that is, about 0.1 to 5% by weight with reference to the monomer or monomers.

Examples of monomers suitable for polymerization according to the invention are: vinyl esters of organic acids, such as vinyl formate, vinyl acetate and vinyl benzoate; vinyl esters of inorganic acids, such as vinyl chloride and vinylidene chloride; acrylic compounds, such as methacrylate, methyl methacrylate; as well as unsaturated dicarboxylic acids, such as maleic acid, fumaric acid, methylene malonic acid, itaconic acid, citraconic acid, or tetrahydrophthalic acid and the mono- or di-esters of such acids, such as, maleic acid, dimethyl or diethyl di-n-butyl esters, maleic acid (2-ethylhexyl)-mono ester, fumaric acid dimethyl, diethyl, di-n-butyl esters, di-(2-ethylhexyl) or dilauryl esters; olefins, such as butadiene, styrene and methyl styrene, which can be polymerized individually or in admixture. The ratio of polymer to water both in emulsion and in dispersion polymerization is in the usual range, that is, about 30 to 70% by weight based upon the sum of the monomers and water.

The polymerization is effected in all instances under the temperature conditions normally employed for the radical or redox polymerization of the monomer or monomers concerned, for example, at or above the boiling temperature of the monomeric material at atmospheric pressures.

In addition to the measures already indicated, other measures customarily employed in emulsion or dispersion polymerization, such as, for example, the addition of regulators, pigments, dyes and pH regulators, can also be employed according to the invention.

The following example will serve to illustrate the process according to the invention.

*Example*

An apparatus such as illustrated in FIGURE 8 consisting of an upright reaction tube 31 having a total length of 1500 mm. and a 10 liter capacity was employed for the dispersion polymerization of vinyl acetate. The reaction tube when viewed from the bottom to the top had a diameter of 80 mm. during the first 1140 mm. thereof and then widened in the next 60 mm. to a diameter of 150 mm. which was maintained in the remaining length of 300 mm. The entire length of the reaction tube was provided with a frame stirrer 32. Furthermore, a stripper plate 3 was provided as in FIGURE 2 which was reciprocated once every 30 minutes in 2 minutes from the lower end of the reaction tube to the bottom of the widened portion and back of the lower end of the reaction tube with the aid of rod 4. The stirrer was rotated at 300 r.p.m. 9 liters per hour of a preemulsion consisting of 48.8% by weight of vinyl acetate, 48.1% by weight of water, 2.85% by weight of polyvinyl alcohol containing residual acetyl groups with the saponification number of 140 (mg. KOH required for splitting off and neutralizing the residual acetyl groups in 1 g. of polyvinyl alcohol) and 0.25% by weight of tert. butyl hydroperoxide (75% by weight) were supplied through inlet 15a and mixed with 0.6 liter per hour of a 0.5% by weight aqueous solution of sodium sulfoxylate formaldehyde (Rongalit C) supplied over inlet 15b in mixing nozzle 19 (shown in FIGURE 9) and the mixture injected into the bottom of the reaction tube. A further 0.3 liter per hour of such sodium sulfoxylate formaldehyde solution was introduced into the column through inlet 15b' located 500 mm. above the bottom thereof.

The reaction tube was provided with two heating zones, the lower shorter zone being maintained at 80° C. with the aid of heating jacket 10 and the upper longer zone being maintained at 70° C. with the aid of heating jacket 13.

The polymerized dispersion left the upper portion of the reaction tube 6 and was supplied to buffer vessel 8 over cooler 7. A nitrogen gauge pressure of 0.6 atmosphere was maintained in buffer vessel 8. The polymerized dispersion was withdrawn from vessel 8 over throttle valve 9 in such a way that the liquid level in vessel 8 remained approximately constant. The pressure drop in the conduit between the reaction tube 31 and buffer vessel 8 was 1 atmosphere so that a gauge pressure of 1.6 atmospheres was maintained in the reaction tube.

The throughput was 240 kg. per day. Even after 1000 hours' operation no disturbances through wall polymerization could be ascertained. The dispersion produced had a viscosity of 5000 cp./20° C. (Höppler), a particle size of 1–2μ and a solids content of 50%.

We claim:

1. An apparatus for the continuous production of aqueous polymer dispersions by polymerization of volatile monomers preemulsified with water with the aid of initiators and emulsifiers during passage through a polymerization zone in a reactor tube comprising a reactor tube, separately controllable heat exchange jackets along the length of such reactor tube, means for continuously supplying the monomer preemulsion to one end of the reactor tube, means for continuously withdrawing the finished polymer dispersion from the other end of the reactor tube, throttling means in the means for withdrawing the finished dispersion adapted to retard the flow of the finished dispersion being withdrawn and thereby to control the pressure in the reactor tube contents during passage therethrough, stirring means extending throughout the length of the polymerization zone in the reactor tube comprising at least two spaced stirring arms rotatable about the longitudinal axis of the reactor tube, the surfaces of which are parallel to such axis, stripping means reciprocatable along the longitudinal axis of the reactor tube closely adjacent to at least one surface of the stirring arms adapted to clean such surface upon reciprocation of such stripping means, means for reciprocating such stripping means without interrupting rotation of such stirring arms, the surface of at least one of the stirring means and the stripping means being closely adjacent to the inner surface of the reactor tube in the polymerization zone so as to be adapted to clean such surface upon relative movement between such surfaces.

2. The apparatus of claim 1 in which the end of the reactor tube from which the finished polymer dispersion is withdrawn is enlarged.

References Cited by the Examiner
UNITED STATES PATENTS

| | | | |
|---|---|---|---|
| 2,361,035 | 10/44 | Klaassen | 165—94 X |
| 2,530,409 | 11/50 | Stober et al. | 23—285 X |
| 2,665,197 | 1/54 | Rowland | 23—285 |
| 2,729,434 | 1/56 | Walden | 15—246 |
| 2,739,137 | 3/56 | Fowler | 260—29.6 |
| 2,789,099 | 4/57 | Rife et al. | 260—29.6 |
| 2,838,380 | 6/58 | Kean | 23—285 |
| 2,838,780 | 6/58 | Kean | 165—94 |

MORRIS O. WOLK, *Primary Examiner.*

JAMES H. TAYMAN, Jr., *Examiner.*